United States Patent [19]

Isozaki et al.

[11] Patent Number: 4,972,027
[45] Date of Patent: Nov. 20, 1990

[54] COMPOSITION CURABLE AT LOW TEMPERATURE

[75] Inventors: Osamu Isozaki, Yokohama; Noboru Nakai, Hiratsuka; Shinji Sugiura, Fujisawa; Satoru Ito, Kanagawa; Seiji Takami, Hiratsuka, all of Japan

[73] Assignee: Kansai Paint Company, Limited, Amagasaki, Japan

[21] Appl. No.: 271,268

[22] Filed: Nov. 15, 1988

[30] Foreign Application Priority Data

Nov. 16, 1987 [JP] Japan .................. 62-289028
Nov. 16, 1987 [JP] Japan .................. 62-289029

[51] Int. Cl.$^5$ .............................................. C08F 8/42
[52] U.S. Cl. .................................. 525/365; 525/364; 525/286; 525/288; 525/72; 525/74
[58] Field of Search ............... 525/477, 479, 242, 243, 525/286, 288, 72, 74, 364, 365

[56] References Cited

U.S. PATENT DOCUMENTS

| | | | |
|---|---|---|---|
| 4,618,644 | 10/1986 | Liv | 524/535 |
| 4,618,653 | 10/1986 | Kawakubo et al. | 528/404 |
| 4,618,656 | 10/1986 | Kawakubo et al. | 525/404 |
| 4,690,986 | 9/1987 | Sasaki et al. | 525/479 |
| 4,772,672 | 9/1988 | Isozaki et al. | 526/273 |
| 4,826,893 | 5/1989 | Yamazaki et al. | 523/115 |

*Primary Examiner*—John C. Bleutge
*Assistant Examiner*—R. Dean, Jr.
*Attorney, Agent, or Firm*—Armstrong, Nikaido, Marmelstein, Kubovcik & Murray

[57] ABSTRACT

Disclosed is a composition curable at a low temperature and characterized in that the composition comprises:

(a) a nonaqueous dispersion of a particulate polymer insoluble in an organic liquid and prepared by polymerizing a radical-polymerizable unsaturated monomer in the organic liquid in the presence of a dispersion stabilizer resin, the stabilizer resin being at least one of a copolymer comprising as its monomer components an oxirane-containing vinyl monomer and an alkoxysilane-containing vinyl monomer and a vinyl copolymer comprising as its monomer components a polysiloxane macromonomer and an oxirane-containing vinyl monomer, (b) a chelate compound admixed with a nonaqueous dispersion.

11 Claims, No Drawings

COMPOSITION CURABLE AT LOW TEMPERATURE

The present invention relates to novel curable compositions.

Compositions are already known which are prepared by admixing an acid, base, organometallic catalyst or the like with an alkoxysilane-containing vinyl polymer and which can be cured by crosslinking at a relatively low temperature, i.e., at room temperature to 100° C. For example, Unexamined Japanese Patent Publication SHO No. 60-67553 discloses a composition which comprises a vinyl polymer containing an alkoxysilane, such as methacryloxypropyltrimethoxysilane, and an aluminum chelate compound admixed with the polymer.

However, the conventional composition has drawbacks. Since the silanol group produced by the hydrolysis of the alkoxysilane is the sole crosslinking functional group, the composition requires a large quantity of water for curing. Consequently, large amounts of by-products, such as alcohol, resulting from the hydrolysis give impaired properties to the cured product. Further when the composition is cured in the presence of only the water in air, the composition is cured only over the surface in contact with air, with its interior remaining almost uncured, so that the difference between the surface and the interior in the degree of curing is liable to result in a shrunk product on curing.

An object of the present invention is to provide a novel composition which is curable at a low temperature and free of the above drawbacks.

Another object of the invention is to provide a novel composition which can be fully cured at a low temperature with a small amount of water.

Another object of the invention is to provide a novel composition which is curable at a low temperature to afford a cured product of excellent properties.

Another object of the invention is to provide a novel composition which is curable at a low temperature only with the moisture in air with a reduced difference between the surface and the interior in the degree of curing without shrinkage and which is easily applicable to produce coatings having an excellent appearance.

These and other objects and features of the invention will become apparent from the following description.

The present invention provides a composition curable at a low temperature and characterized in that the composition comprises:

(a) a nonaqueous dispersion of a particulate polymer insoluble in an organic liquid and prepared by polymerizing a radical-polymerizable unsaturated monomer in the organic liquid in the presence of a dispersion stabilizer resin, the stabilizer resin being at least one of a copolymer (hereinafter referred to as the "copolymer X") comprising as its monomer components an oxirane-containing vinyl monomer and an alkoxysilane-containing vinyl monomer represented by the formula

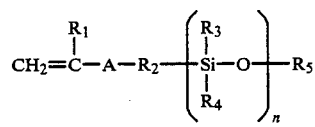
(I)

wherein A is

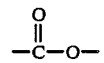

or

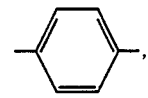

, $R_1$ is a hydrogen atom or methyl, $R_2$ is a bivalent aliphatic saturated hydrocarbon group having 1 to 6 carbon atoms, $R_3$ and $R_4$ are the same or different and are each phenyl, alkyl having 1 to 6 carbon atoms or alkoxyl having 1 to 10 carbon atoms, $R_5$ is alkyl having 1 to 10 carbon atoms, and n is an integer of from 1 to 10, and a vinyl copolymer (hereinafter referred to as the "copolymer Y") comprising as its monomer components;

i) the polysiloxane macromonomer prepared by reacting about 70 to about 99.999 mole % of a compound (A) represented by the formula

(II)

wherein $R_6$ is an aliphatic hydrocarbon group having 1 to 8 carbon atoms or phenyl, and $R_7$, $R_8$ and $R_9$ are each alkoxyl having 1 to 4 carbon atoms or hydroxyl with about 30 to about 0.001 mole % of a compound (B) represented by the formula

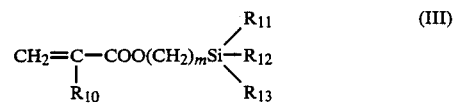
(III)

wherein $R_{10}$ is a hydrogen atom or methyl, $R_{11}$, $R_{12}$ and $R_{13}$ are each hydroxyl, alkoxyl having 1 to 4 carbon atoms or an aliphatic hydrocarbon group having 1 to 8 carbon atoms, at least one of $R_{11}$, $R_{12}$ and $R_{13}$ being hydroxyl or alkoxyl, and m is an integer of 1 to 6, the polysiloxane macromonomer having per molecule at least two functional groups selected from hydroxyl and the alkoxyl and being about 400 to about 100,000 in number average molecular weight, and ii) an oxirane-containing vinyl monomer, (b) a chelate compound admixed with the nonaqueous dispersion.

The research conducted by the present inventor has revealed that the above drawbacks of the prior art can be overcome by preparing a nonaqueous dispersion of the above-specified particulate polymer using at least one of the copolymer X and the copolymer Y as a dispersion stabilizer resin, and admixing a chelate compound with the nonaqueous dispersion. The research has further revealed the following.

(1) The alkoxysilane-containing vinyl polymer is made to contain an oxirane group, with the result that not only the silanol group but also the oxirane serves as a crosslinking functional group, rendering the composition thoroughly curable in the presence of a small amount of water.

(2) Accordingly, the composition forms greatly reduced amounts of alcohol and like by-products when curing, giving a cured product with excellent properties.

(3) When to be cured only with the moisture in air, the composition undergoes crosslinking due to the presence of silanol groups over the surface of the coating exposed to air and further undergoes crosslinking throughout the interior in a chainlike fashion owing to the presence of oxirane groups. This diminishes the difference in the degree of curing between the surface and the interior to obviate shrinkage.

(4) With the particulate polymer present in the composition with good stability, the composition exhibits high storage stability and is applicable efficiently.

(5) The particulate polymer present in the cured product gives an esthetic appearance to the product and reinforces the product to give improved properties thereto.

The present invention has been accomplished based on these novel findings.

The dispersion stabilizer resin for use in the invention will be described first.

With reference to the formula (I) representing one of the monomer components of the copolymer X, n is an interger of 1 to 10.

With reference to the formula (I), the bivalent saturated aliphatic hydrocarbon group having 1 to 6 carbon atoms and represented by $R_2$ is a straight-chain or branched-chain alkylene group, such as methylene, ethylene, propylene, 1,2-buthylene, 1,3-buthylene, 2,3-buthylene, tetramethylene, pentamethylene, hexamethylene or the like. The alkyl group represented by $R_3$ and $R_4$ and having 1 to 6 carbon atoms is a straight-chain or branched-chain alkyl group, such as methyl, ethyl, n-propyl, isopropyl, n-butyl, isobutyl, sec-butyl, tert-butyl, n-pentyl, isopentyl, neopentyl, n-hexyl, isohexyl or the like. Examples of alkyl groups represented by $R_5$ having 1 to 10 carbon atoms are above-mentioned alkyl groups and further n-heptyl, 1-methylpentyl, 2-methylhexyl, n-octyl, n-nonyl, n-decyl and the like. The alkoxyl group represented by $R_3$ and $R_4$ and having 1 to 10 carbon atoms is a straight-chain or branched-chain alkoxyl group, such as methoxy, ethoxy, n-propoxy, isopropoxy, n-butoxy, isobutoxy, sec-butoxy, tert-butoxy, n-pentoxy, isopentoxy, n-hexyloxy, isohexyloxy, n-octyloxy or the like. When n in the formula (I) is at least 2, the groups $R_3$, as well as groups $R_4$, may be the same or different.

Of the compounds of the formula (I) for use in the invention, those wherein A is

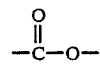

are, for example, γ-(meth)acryloxypropyltrimethoxysilane, γ-(meth)acryloxypropyltriethoxysilane, γ-(meth)acryloxypropyltripropoxysilane, γ-(meth)acryloxypropylmethyldimethoxysilane, γ(meth)acryloxypropylmethyldiethoxysilane, γ-(meth)acryloxypropylmethyldipropoxysilane, γ-(meth)acryloxybutylphenyldimethoxysilane, γ-(meth)acryloxybutylphenyldiethoxysilane, γ-(meth)acryloxybutylphenyldipropoxysilane, γ-(meth)acryloxypropyldimethylmethoxysilane, γ(meth)aoryloxypropyldimethylethoxysilane, γ-(meth)acryloxypropylphenylmethylmethoxysilane, γ-(meth)acryloxypropylphenylmethylethoxysilane,

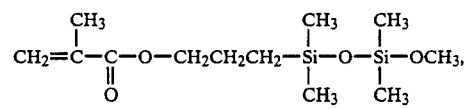

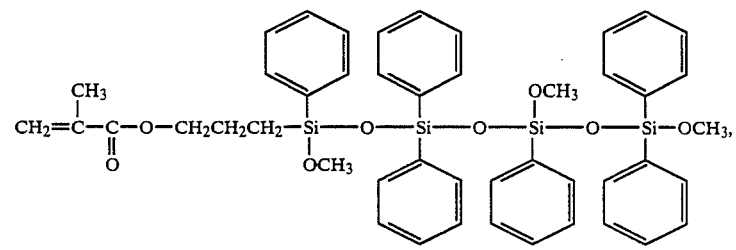

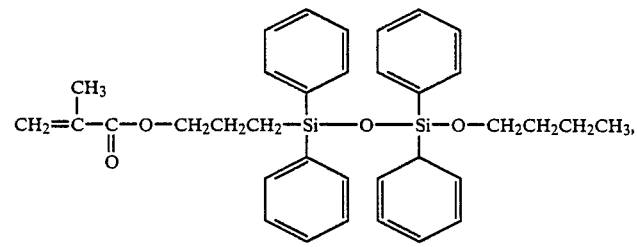

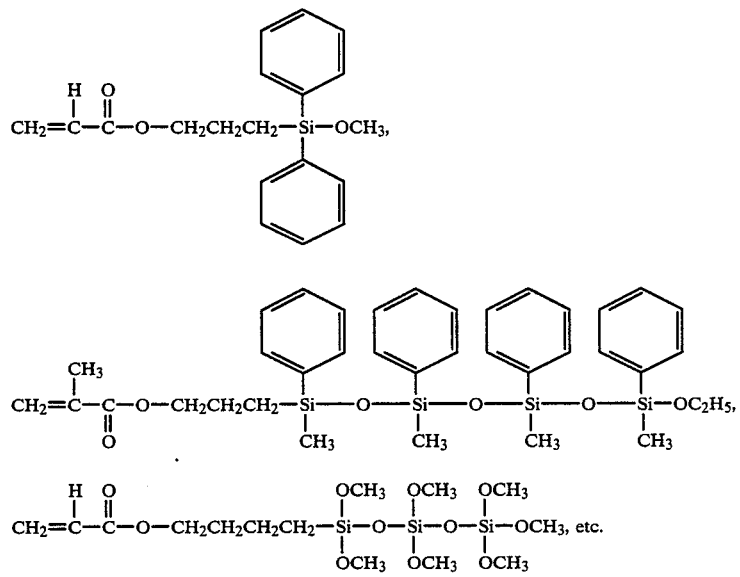

Further of compounds of the formula (I), those wherein A is

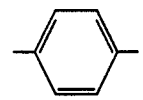

are, for example,

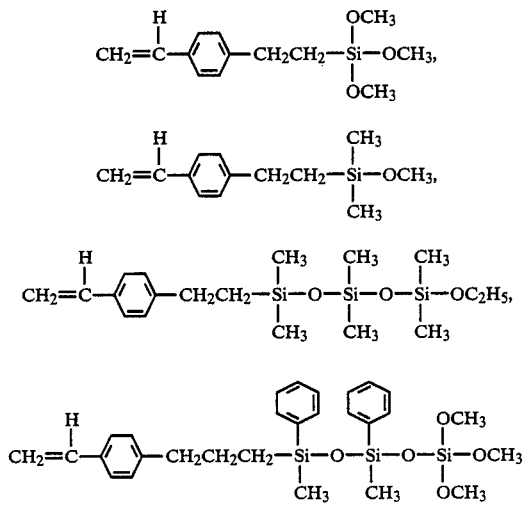

-continued

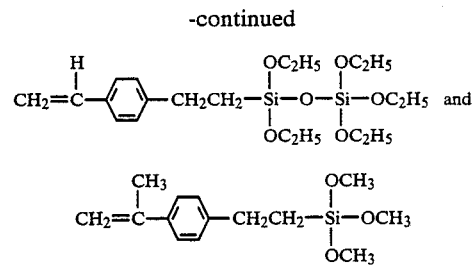

The oxirane-containing vinyl monomer to be used is one of various vinyl monomers having an oxirane group in the molecule.

It is especially desirable to use vinyl monomers containing an alicyclic oxirane group, for example, in view of curability. Use of these monomers results in the advantage of expedited curing and giving improved properties to the coating on curing since the alicyclic oxirane group is highly reactive in ring-cleavage polymerization reaction.

It is more desirable to use acrylic or methacrylic acid esters containing an alicyclic oxirane group, such as those represented by the following formulae (IV) to (XV).

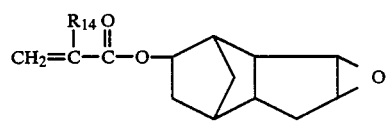

(IV)

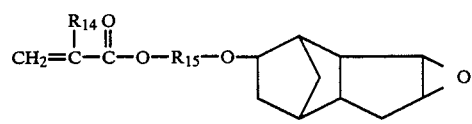

(V)

-continued

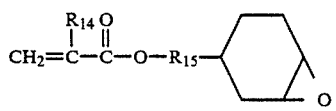 (VI)

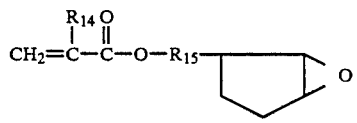 (VII)

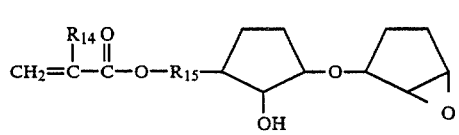 (VIII)

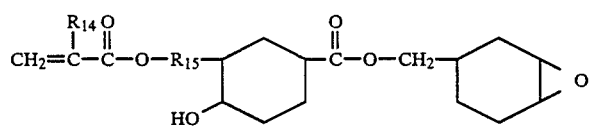 (IX)

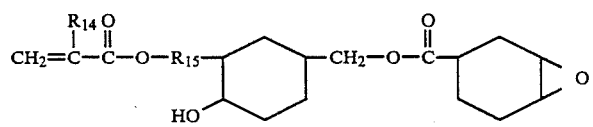 (X)

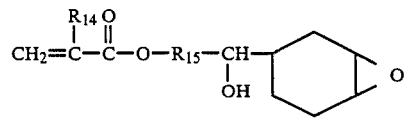 (XI)

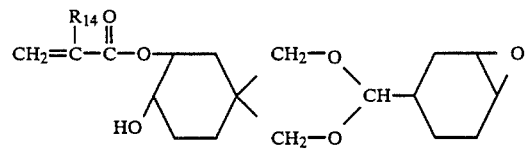 (XII)

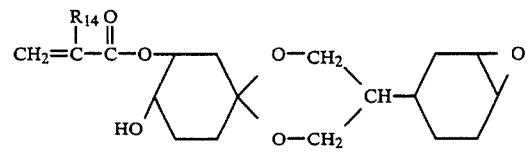 (XIII)

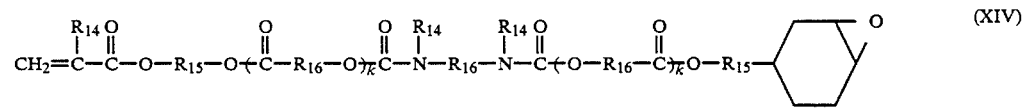 (XIV)

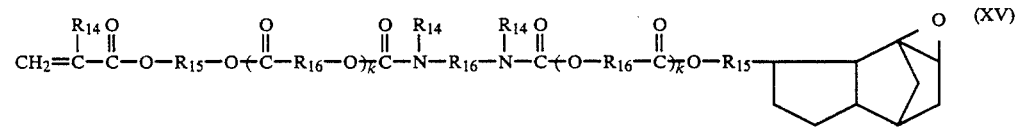 (XV)

In the above formulae, $R_{14}$ is a hydrogen atom or methyl and the $R_{14}$ groups are the same or different, $R_{15}$ is a bivalent aliphatic saturated hydrocarbon group having 1 to 6 carbon atoms and the $R_{15}$ groups are the same or different, $R_{16}$ is a bivalent hydrocarbon group having 1 to 10 carbon atoms and the $R_{16}$ groups are the same or different, and k is an integer of from 0 to 10.

Examples of bivalent aliphatic saturated hydrocarbon groups $R_{15}$ having 1 to 6 carbon atoms are straight-chain or branched-chain alkylene groups such as methylene, ethylene, propylene, tetramethylene, ethylethylene, pentamethylene and hexamethylene. Examples of bivalent hydrocarbon groups $R_{16}$ having 1 to 10 carbon atoms are methylene, ethylene, propylene, tetramethylene, ethylethylene, pentamethylene, hexamethylene, polymethylene, phenylene,

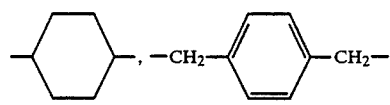

and the like.

Typical of vinyl monomers containing an oxirane group other than the alicyclic oxirane group are, for example, those represented by the following formula (XVI).

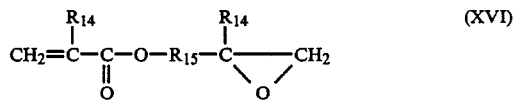

wherein $R_{14}$ and $R_{15}$ are as defined above.

More specific examples of compounds of the formula (XVI) are glycidyl methacrylate, glycidyl acrylate, methylglycidyl methacrylate, methylglycidyl acrylate and the like.

When monomers of the formula (XVI) are used as the oxirane-containing monomer, the composition requires baking at a slightly higher temperature than when monomers of the formulae (IV) to (XV) are used, whereas the composition can be given improved curability when incorporating a compound having at least two alicyclic oxirane groups in the molecule as will be described later.

The copolymer X for use in the present curable composition as its resin component is a copolymer comprising an alkoxysilane-containing vinyl monomer of the formula (I) (hereinafter referred to as the "monomer A") and an oxirane-containing monomer (hereinafter referred to as the "monomer B") as its monomer components. Thus, the copolymer X consists essentially of the monomer A and the monomer B. The ratio of the monomer A to the monomer B, i.e. A:B, is usually 1 : about 0.02 to about 10,000 by weight. If the monomer B is present in a proportion greater than this range, reduced curability tends to result, whereas the presence of the monomer B in a proportion less than this range gives a cured product of impaired properties with an increased likelihood of shrinkage, hence undesirable. The A:B ratio is preferably 1 : about 0.1 to about 1,000 by weight, more preferably 1 : about 0.25 to about 100 by weight.

The copolymer X can be prepared by a common process under usual conditions.

An $\alpha,\beta$-ethylenically unsaturated monomer is usable as an optional monomer component of the copolymer X. Such a monomer can be selected from a wide variety of compounds in accordance with the desired properties. Typical examples of such unsaturated monomers are as follows.

(1) Esters of acrylic acid or methacrylic acid $C_1$ to $C_{18}$ alkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_2$ to $C_{18}$ alkoxyalkyl esters of acrylic acid or methacrylic acid such as methoxybutyl acrylate, methoxybutyl methacrylate, methoxyethyl acrylate, methoxyethyl methacrylate, ethoxybutyl acrylate and ethoxybutyl methacrylate; $C_2$ to $C_8$ alkenyl esters of acrylic acid or methacrylic acid such as allyl acrylate and allyl methacrylate; $C_2$ to $C_8$ hydroxyalkyl esters of acrylic acid or methacrylic acid such as hydroxyethyl acrylate, hydroxyethyl methacrylate, hydroxypropyl acrylate and hydroxypropyl methacrylate; addition products of the above hydroxyalkyl esters of acrylic acid or methacrylic acid with polycaprolactone; and $C_3$ to $C_{18}$ alkenyloxyalkyl esters of acrylic acid or methacrylic acid such as allyloxyethyl acrylate and allyloxyethyl methacrylate.

(2) Vinyl aromatic compounds

Styrene, $\alpha$-methylstyrene, vinyltoluene and p-chlorostyrene.

(3) Polyolefinic compounds

Butadiene, isoprene and chloroprene.

(4) Others

Acrylonitrile, methacrylonitrile, methyl isopropenyl ketone, vinyl acetate, Veova monomer (product of Shell Chemical), vinyl propionate, vinyl pivalate, etc.

Besides these monomers (1) to (4), also usable are, for example, acrylamide, methacrylamide, N-methylolacrylamide, N-methylolmethacrylamide, N-methylolacrylamide butyl ether, dimethylaminoethyl methacrylate, diethylaminoethyl methacrylate, acrylic acid, methacrylic acid, itaconic acid, crotonic acid, allyl alcohol, maleic acid and fumaric acid. These monomers are usable in such an amount that will not gel the dispersion stabilizer.

To give the copolymer X improved ability to serve as a dispersion stabilizer, it is desirable that the monomer components thereof include a monomer in the form of an ester of methacrylic acid or acrylic acid with a $C_4C_{18}$ monoalcohol in an amount of at least about 20 to about 95 wt. %, preferably at least about 40 to about 90 wt %, based on the combined amount of all the monomers.

The other copolymer Y comprises as a monomer component thereof a polysiloxane macromonomer. This macromonomer has the main skeleton of siloxane bond having an aliphatic hydrocarbon group, phenyl, hydroxyl, alkoxyl, polymerizable unsaturated bond, etc. directly or indirectly attached to Si of the siloxane bond. The macromonomer can be obtained by reacting a compound (A) represented by the formula (II) with a compound (B) represented by the formula (III).

In the above formula (II) representing the compound (A), $R_6$ is an aliphatic hydrocarbon group having 1 to 8 carbon atoms or phenyl, and $R_7$, $R_8$ and $R_9$ are each alkoxyl having 1 to 4 carbon atoms or hydroxyl. $R_7$, $R_8$ and $R_9$ may all be the same or different, or at least one of them may be different from the others.

In the compound (A), examples of alkoxyl groups having 1 to 4 carbon atoms are straight-chain or branched-chain groups such as methoxy, ethoxy, propoxy, butoxy and the like. Examples of aliphatic hydrocarbon groups having 1 to 8 carbon atoms are methyl, ethyl, propyl, butyl, copolymerization reaction, whereas if it is larger than 99.999 mole %, the amount of uncopolymerized polysiloxane pentyl, hexyl, heptyl, octyl and the like which are straight-chain or branched-chain groups.

Methyl and phenyl are especially desirable as $R_6$ in the compound (A). Preferable as $R_7$, $R_8$ and $R_9$ are methoxy, ethoxy, propoxy, butoxy and hydroxyl. Examples of preferred compounds (A) are methyltrimethoxysilane, phenyltrimethoxysilane, butyltrimethoxysilane, methyltriethoxysilane, methyltributoxysilane, phenyltrisilanol, methyltrisilanol and the like, among which methyltrimethoxysilane, phenyltrimethoxysilane and phenyltrisilanol are especially desirable. These compounds can be used singly or in combination.

In the above compound (B), $R_{10}$ represents a hydrogen atom or methyl, and $R_{11}$, $R_{12}$ and $R_{13}$ are each hydroxyl, alkoxyl having 1 to 4 carbon atoms or an aliphatic hydrocarbon group having 1 to 8 carbon atoms. m is an integer of 1 to 6. $R_{11}$, $R_{12}$ and $R_{13}$ may all be the same or different, or at least one of them may be different from the others. However, at least one of them is hydroxyl or alkoxyl.

In the compound (B), examples of aliphatic hydrocarbon groups having 1 to 8 carbon atoms, as well as alkoxyl groups having 1 to 4 carbon atoms, can be those exemplified for the compound (A). Methoxy, ethoxy and hydroxyl groups are especially desirable as $R_{11}$, $R_{12}$ and $R_{13}$, and m is preferably in the range of from 2 to 4. Examples of preferable compounds (B) are β-acryloxyethyltriethoxysilane, β-methacryloxyethyltriethoxysilane, γ-methacryloxypropyltrimethoxysilane, γ-methacryloxypropyltriethoxysilane, γ-acryloxypropyltrimethoxysilane, γ-methacryloxybutyltriethoxysilane, γ-acryloxypropyltrisilanol and the like. More preferable among these examples are β-acryloxyethyltriethoxysilane, β-methacryloxyethyltriethoxysilane, γ-methacryloxypropyltrimethoxysilane, γ-methacryloxypropyltriethoxysilane and γ-acryloxypropyltrisilanol. These compounds can be used singly or in combination.

According to the present invention, the polysiloxane macromonomer can be prepared by reacting the compound (A) with the compound (B). The proportions of the two compounds, based on the combined amount thereof, are about 70 to about 99.999 mole %, preferably about 90 to about 99.9 mole %, more preferably about 95 to about 99 mole %, of the compound (A), and about 30 to about 0.001 mole %, preferably about 10 to about 0.1 mole %, more preferably about 5 to about 1 mole %, of the compound (B). If the amount of the compound (A) is less than 70 mole %, the mixture is liable to gel during the copolymerization reaction, whereas if it is larger than 99.999 mole %, the amount of uncopolymerized polysiloxane increases to render the resin solution turbid, hence undesirable.

The reaction between the compounds (A) and (B) is effected by the dehydration condensation of the hydroxyl groups contained in these compounds and/or the hydroxyl groups resulting from the hydrolysis of the alkoxyl groups of the compounds. Depending on the reaction conditions, the reaction involves dealcoholization condensation in addition to the dehydration reaction.

Although the reaction can be carried out in the absence of solvent, it is desirable to conduct the reaction in water and/or an organic solvent wherein both the compounds (A) and (B) are soluble. Examples of desirable organic solvents are hydrocarbon solvents such as heptane, toluene, xylene, octane and mineral spirit, ester solvents such as ethyl acetate, n-butyl acetate, isobutyl acetate, methyl cellosolve acetate and butylcarbitol acetate, ketone solvents such as methyl ethyl ketone, methyl isobutyl ketone and diisobutyl ketone, alcoholic solvents such as ethanol, isopropanol, n-butanol, sec-butanol and isobutanol, ether solvents such as n-butyl ether, dioxane, ethylene glycol monomethyl ether and ethylene glycol monoethyl ether, and the like. These solvents are usable singly or in combination.

When the compounds (A) and (B) are used in the form of a solution, the combined concentration of these compounds in the solution is suitably at least about 5 wt. %.

According to the invention, the compounds (A) and (B) are reacted suitably at a temperature of about 20 to about 180° C., preferably about 50° to about 120° C. The reaction time is suitably about 1 to about 40 hours usually.

When required, the reaction may be carried out in the presence of a polymerization inhibitor, which is effective for preventing the polymerization reaction due to unsaturated bonds in the compound (B). Examples of useful inhibitors are hydroquinone, hydroquinone monomethyl ether and like quinone compounds.

The reaction system of compounds (A) and (B) for preparing the polysiloxane macromonomer may have incorporated therein tetraalkoxysilane, dialkyldialkoxysilane or the like, which can be used in an amount of up to about 20 mole % based on the combined amount of the compounds (A) and (B).

When $R_7$, $R_8$, $R_9$, $R_{11}$, $R_{12}$ and $R_{13}$ in the compounds (A) and (B) are all hydroxyl, it is desirable to conduct the reaction in an organic solvent with heating and stirring for dehydration condensation.

Further when at least one of the compounds (A) and (B) has alkoxyl attached to Si, it is desired to effect hydrolysis before condensation. The hydrolysis reaction and the condensation reaction can be carried out continuously in the presence of water and a catalyst with heating and stirring. The amount of water to be used for these reactions, although not limited specifically, is preferably at least about 0.1 mole per mole of alkoxyl. With less than about 0.1 mole of water present, the two compounds are likely to become lower in reactivity. It is most preferable to use a large excess of water. In the case where the condensation reaction produces an alcohol which is sparingly soluble in water, the use of water and a water-soluble organic solvent in combination serves to render the reaction system uniform. Desirable for use as water-soluble organic solvents are the aforementioned alcoholic, ester, ether and ketone solvents. Acids or alkali catalysts are usable as catalysts for the hydrolysis reaction. Examples of useful acid catalysts are hydrochloric acid, sulfuric acid, phosphoric acid, formic acid, acetic acid, propionic acid, acrylic acid, methacrylic acid and the like. Examples of useful alkali catalysts are sodium hydroxide, triethylamine, ammonia and the like. It is suitable to use the catalyst in an amount of about 0.0001 to about 5 wt. %, preferably about 0.01 to about 0.1 wt. %, based on the combined amount of the compounds (A) and (B).

The polysiloxane macromonomer to be used in this invention is about 400 to about 100,000, preferably about 1,000 to about 20,000, in number average molecular weight. If this value is less than about 400, the copolymerization reaction system tends to gel, whereas values exceeding about 100,000 is likely to result in impaired compatibility, hence undesirable.

The main skeleton of the polysiloxane macromonomer afforded by the reaction of the compounds (A) and (B) in the present invention comprises a siloxane bond. The main skeleton primarily has a linear structure, ladder structure or a structure in the form of a combination of these structures. It is desirable to use a macromonomer of ladder structure, or a macromonomer of combination structure having a larger proportion of ladder structure, from the viewpoint of resistance to water, heat and light. The structure of the macromonomer can be selectively determined as desired according to the ratio between the compound (A) and the compound (B), the amounts of water and acid catalyst, etc. The polysiloxane macromonomer has a structure wherein the Si of the siloxane bond has attached thereto groups such as $R_6$ and $R_7$ to $R_9$ of the formula (II), a group of the formula

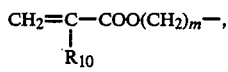

and $R_{11}$ to $R_{13}$ of the formula (III). The macromonomer has as attached to the Si at least two free functions groups per molecule such as hydroxyl and alkoxyl having 1 to 4 carbon atoms (i.e., silanol group and/or alkoxysilane group).

It is further desired that the polysiloxane macromonomer have on the average about 0.2 to about 1.9, preferably about 0.6 to about 1.4, more preferably about 0.9 to about 1.2, polymerizable unsaturated bonds per molecule. With a very small quantity of polymerizable unsaturated bonds present, the copolymerization reaction product is liable to become turbid, whereas when having an excess of such bonds, the macromonomer is likely to gel during the reaction, hence undesirable.

The number of unsaturated bonds in the macromonomer can be determined by the following method.
(1) Various polysiloxane macromonomers are prepared by reacting the compound (A) with the compound (B) in suitably varying ratios.
(2) A nonfunctional vinyl monomer is reacted with the macromonomer in varying ratios to obtain various vinyl copolymers. The nonfuctional vinyl monomer to be used is a vinyl monomer which has a polymerizable unsaturated bond portion as a portion reactive with the unsaturated bond in the macromonomer and which has no functional group reactive with the alkoxysilane group and/or the silanol group in the macromonomer. Examples of nonfunctional vinyl monomers which can be used are styrene, vinyltolume, an ester of acrylic acid or methacrylic acid with a monovalent alcohol, and the like.
(3) The molecular weight distributions of the resulting vinyl copolymers are determined by gel permeation chromatography (G.P.C.).
(4) When the copolymers obtained using the macromonomer and the nonfunctional vinyl monomer in varying ratios are approximately identical in peak molecular weight (molecular weight for the highest content) and have a distribution curves with a single peak, free from low-molecular-weight components (macromonomers free from unsaturated bond) or high-molecular-weight components (copolymers of macromonomers having at least two unsaturated bonds), the macromonomer used can then be interpreted as having one polymerizable unsaturated bond per molecule on the average.
(5) The average number of polymerizable unsaturated bonds in the other macromonomers can be given by $$\frac{[B]/[A]}{[B_1]/[A_1]}$$

wherein [A] is the mole number of the compound (A) used, [B] is the mole number of the compound (B) used, and $[A_1]$ and $[B_1]$ are the mole numbers of the compound (A) and the compound (B), respectively, used for giving the macromonomer having one polymerizable unsaturated bond on the average.

For example, it is assumed the molar ratio of compound (B)/compound (A)=1/20 affords a macromonomer having one polymerizable unsaturated bond. The molar ratio of compound (B)/compound (A)=0.9/20 then gives a macromonomer having 0.9 polymerizable unsaturated bond on the average.

The other monomer of the copolymer Y for use in the invention is an oxirane-containing vinyl monomer. Examples of such monomers are glycidyl methacrylate, glycidyl acrylate and like compounds represented by the formula (XVI), vinyl glycidyl ether and like glycidylcontaining monomers, alicyclic oxirane-containing monomers of the formulae given below, the monomers of the formula (IV) to (XV), etc.

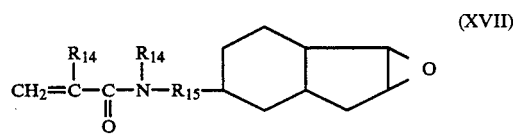

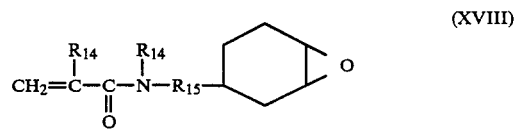

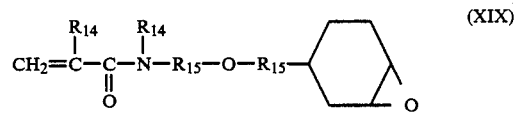

$R_{14}$ and $R_{15}$ are as defined above.

Among these oxirane-containing vinyl monomers, it is desirable to use alicyclic oxirane-containing vinyl monomers represented by the formulae (IV) to (XV) and (XVII) to (XIX) from the viewpoint of curability.

However, even when the monomer of (XVI) is used, improved curability can be given by additionally using an alicyclic oxirane-containing compound. Glycidyl methacrylate which is typical of the comounds (XVI) has the advantage of being inexpensive and readily available.

The polysiloxane macromonomer and the oxirane-containing vinyl monomer are used as monomer components to give a vinyl copolymer for use as the copolymer Y of the present invention. When required, polymerizable vinyl monomers other than these monomers are usable as monomer components of the copolymer Y. Such a polymerizable vinyl monomer can be selected from among a wide variety of monomers in accordance with the desired properties. Typical of these unsaturated monomers are the monomers (1) to (4) given above.

Among these monomers, acrylic acid, methacrylic acid and like acid monomers, and dimethylaminoethyl methacrylate, acrylamide and like basic monomers, when present in large quantities in the copolymerization system, tend to gel during the reaction, so that such monomers should be used in a minimized amount.

To give the copolymer Y improved ability to serve as a dispersion stabilizer, it is desirable that the monomer components thereof include a monomer in the form of an ester of methacrylic acid or acrylic acid with a $C_4$-$C_{18}$ monoalcohol in an amount of at least about 20 to about 95 wt. %, preferably at least about 40 to about 90 wt. %, based on the combined amount of all the monomers.

The monomers for preparing the copolymer Y to be used for the composition of the invention are used in the following amounts. When the copolymer is composed of two components, i.e. polysiloxane macromonomer and oxirane-containing vinyl monomer, about 0.01 to about 98 wt. % of the former and about 99.99 to about 2 wt. % of the latter, preferably about 0.1 to about 80 wt. % of the former and about 99.9 to about 20 wt. % of the latter, are used. If the amount of polysiloxane macromonomer used is smaller than this range, reduced curability tends to result, whereas amounts exceeding this range are undesirable since the cured product then exhibits impaired properties and is liable to shrinkage.

Further when another polymerizable vinyl monomer is used in addition to the above two kinds of monomers, about 0.01 to about 80 wt. % of polysiloxane macromonomer, about 1 to about 90 wt. % of oxirane-containing vinyl monomer and up to about 98.99 wt. % of other polymerizable vinyl monomer are used. More preferably, about 0.1 to about 60 wt. % of polysiloxane macromonomer, about 3 to about 60 wt.% of oxirane-containing vinyl monomer and about 10 to about 96.9 wt.% of other polymerizable vinyl monomer are used. It is undesirable to use the macromonomer and the oxirane-containing vinyl monomer in amounts outside the above ranges for the same reasons as give above.

The copolymer Y can be prepared by the same process and under the same conditions as usually used for preparing acrylic resins or vinyl resins. For example, the copolymer can be prepared by dissolving or dispersing the monomer components in an organic solvent and heating the solution or dispersion at a temperature of about 60 to about 180° C. with stirring in the presence of a radical polymerization initiator. The reaction is conducted usually for about 1 to about 10 hours. Examples of useful organic solvents are those exemplified already, including alcohol solvents, ether solvents, ester solvents, hydrocarbon solvents and the like. The hydrocarbon solvent, when to be used, is used preferably in combination with other solvents in view of solubility. The radical polymerization initiator can be any of those generally used. Examples of such initiators are benzoyl peroxide, t-butylperoxy-2-ethyl hexanoate and like peroxides, azoisobutyronitrile, azobisdimethylvaleronitrile and like azo compounds.

Generally, it is suitable that the copolymer X or Y for use as the dispersion stabilizer resin in the present invention have a number average molecular weight of about 2,000 to about 200,000, preferably about 5,000 to about 200,000. If the molecular weight is less than about 2,000, the particles dispersed will not be fully stabilized but are liable to agglomerate or settle, whereas if the molecular weight exceeds about 200,000, the dispersion becomes exceedingly viscous and difficult to handle, hence undesirable.

For use in the present invention, the dispersion stabilizer resin may be used singly, or at least two of such resins, which differ in the copolymer composition or in molecular weight, may be used in combination. Further when required, the resin is usable conjointly with a small amount of other dispersion stabilizer such as butyl-etherified melamine-formaldehyde resin, alkyd resin, or common acrylic resin which does not contain the compound of the formula (I) as its copolymer component.

According to the present invention, a radical-polymerizable unsaturated monomer is polymerized in an organic liquid in the presence of the dispersion stabilizer resin to prepare a nonaqueous dispersion of a particulate polymer insoluble in the organic liquid.

The organic liquids useful for the polymerization include those in which the dispersed particulate polymer resulting from the polymerization are substantially insoluble and which are good solvents for the stabilizer resin and the radical-polymerizable unsaturated monomer. Examples of such organic liquids are aliphatic hydrocarbons including hexane, heptane, octane, mineral spirit and naphtha; aromatic hydrocarbons including benzene, toluene and xylene; alcohols including isopropyl alcohol, n-butyl alcohol, isobutyl alcohol and octyl alcohol; ethers including cellosolve, butyl cellosolve, diethylene glycol monobutyl ether; ketones including methyl isobutyl ketone, diisobutyl ketone, methyl ethyl ketone, ethyl acyl ketone, methyl hexyl ketone and ethyl butyl ketone; esters including ethyl acetate, isobutyl acetate, amyl acetate and 2-ethylhexyl acetate; etc. These organic liquid may be used singly, or at least two of them are usable in admixture. Generally, it is suitable to use an aliphatic hydrocarbon chiefly in combination with an aromatic hydrocarbon, alcohol, ether, ketone or ester. Also usable when required are trichlorotrifluoroethane, m-xylenehexa fluoride, tetrachlorohexafluorobutane and the like.

The particulate polymer component of the nonaqueous dispersion can be any of the monomers already mentioned as being usable for preparing dispersion stabilizers. Since the particulate polymer should be insoluble in the organic liquid used, the polymer is preferably a copolymer containing a large amount of a monomer having high polarity, such as methyl (meth)acrylate, ethyl (meth)acrylate, (meth)acrylonitrile, 2-hydroxy (meth)acrylate, hydroxypropyl (meth)acrylate, (meth)acrylamide, acrylic acid, methacrylic acid, itaconic acid, styrene, vinyltoluene, α-methylstyrene or N-methylol(meth)acrylamide. The particles in the nonaqueous dispersion can be those already crosslinked. Internally crosslinked particles can be obtained by copolymerizing functional monomers such as divinylbenzene and ethylene glycol diacrylate, or reacting such monomers with each other. Alternatively, at least one monomer having a functional group reactive with itself is polymerized to obtain particles, which are then formulated into a nonaqueous dispersion, followed by crosslinking of the particles. Various intraparticle crosslinking reactions are usable which include the reaction disclosed in Unexamined Japanese Patent Publication SHO 53-133236.

The monomer is polymerized usually using a radical polymerization initiator. Examples of radical polymerization initiators usable are azo initiators such as 2,2′-azobisisobutyronitrile and 2,2′-azobis(2,4-dimethylvaleronitrile); peroxide initiators such as benzoyl peroxide, lauryl peroxide, tert-butyl peroctoate and tert-butylperoxy-2-ethyl hexanoate; etc. These initiators can be used in an amount of about 0.2 to about 10 parts by weight, preferably about 0.5 to about 5 parts by weight, per 100 parts by weight of the monomer to be polymerized.

The proportion of the dispersion stabilizer resin to be present in the polymerization system is variable over a wide range, for example, according to the kind of resin used. Generally, it is suitable to use about 3 to about 240 parts by weight, preferably about 5 to about 82 parts by weight, of the radical-polymerizable unsaturated monomer per 100 parts by weight of the stabilizer resin. The combined concentration of the stabilizer resin and the radical-polymerizable unsaturated monomer in the organic liquid is generally about 30 to about 70 wt.%, preferably about 30 to about 60 wt.%.

The polymerization is effected in a known manner. The reaction temperature for the polymerization is usually about 60 to about 160° C. The reaction usually takes about 1 to about 15 hours.

In this way, a stable nonaqueous dispersion is obtained wherein the liquid phase is the organic liquid having the stabilizer resin dissolved therein, and the solid phase is polymer particles formed by the polymerization of the radical-polymerizable unsaturated monomer. The particulate polymer is usually in the range of about 0.1 to about 1.0 μm in particle size. Particle sizes smaller than this range are not desirable since the composition has a higher viscosity, while particles sizes larger than this range are not desirable either since the particles will swell or agglomerate during storage.

According to the present invention, the dispersion stabilizer resin is bonded to the particulate polymer to give the resulting composition improved storage stability and enable the composition to form on curing a coating which is excellent in transparency, surface smoothness and mechanical characteristics. The stabilizer resin can be bonded to the particulate polymer by introducing a polymerizable double bond into the stabilizer and polymerizing the radically polymerizable unsaturated monomer in the presence of the stabilizer.

The polymerizable double bond can be introduced into the stabilizer resin most advantageously by adducting an α,β-ethylenically unsaturated monocarboxylic acid, such as acrylic acid, methacrylic acid or itaconic acid, with some of the oxirane groups in the copolymer. Alternatively, an insocyanate-containing monomer, such as isocyanoethyl methacrylate, is adducted with hydroxyl groups present in the copolymer.

The composition of the invention comprises the aqueous dispersion and a chelate compound serving as a crosslinking curing agent and admixed therewith.

The chelate compounds for use in the invention are preferably aluminum chelate compounds, titanium chelate compounds and zirconium chelate compounds. Of these chelate compounds, more preferable are those containing a compound capable of forming a keto-enol tautomer, as ligands forming a stable chelate ring.

Examples of useful compounds capable of forming a keto-enol tautomer are β-diketones (such as acetylacetone), acetoacetic acid esters (such as methyl acetoacetate), malonic esters (such as ethyl malonate), ketones having hydroxyl in the β-position (such as diacetone alcohol), aldehydes having hydroxyl in the β-position (such as salicylaldehyde), esters having hydroxyl in the β-position (such as methyl salicylate), etc. Especially preferred results can be achieved when acetoacetates and β-diketones are used.

The aluminum chelate compound can be prepared advantageously, for example, by admixing the compound capable of forming a keto-enol tautomer with an aluminum alcoholate represented by the formula

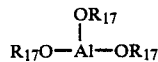

wherein $R_{17}$ is alkyl having 1 to 20 carbon atoms or alkenyl and the $R_{17}$ groups are the same or different, usually in the ratio of up to about 3 moles of the former per mole of the latter, and heating the mixture when required.

Examples of alkyl groups having 1 to 20 carbon atoms are the aforementioned alkyl groups having 1 to 10 carbon atoms, undecyl, dodecyl, tridecyl, tetradecyl, octadecyl and the like. Examples of alkenyl groups are vinyl, allyl and the like.

Examples of aluminum alcoholates represented by the formula (XX) are aluminum trimethoxide, aluminum triethoxide, aluminum tri-n-propoxide, aluminum triisopropoxide, aluminum tri-n-butoxide, aluminum triisobutoxide, aluminum tri-sec-butoxide, aluminum tri-tert-butoxide, etc. It is especially desirable to use aluminum triisopropoxide, aluminum tri-sec-butoxide and aluminum tri-n-butoxide.

The titanium chelate compound can be prepared advantageously, for example, by admixing the compound capable of forming a keto-enol tautomer with a titanate represented by the formula

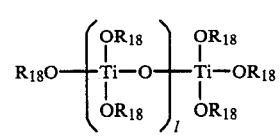

wherein : is an integer of 0 to 10, and $R_{18}$ is alkyl having 1 to 20 carbon atoms or alkenyl and the $R_{18}$ groups are the same or different, usually in the ratio of up to about 4 moles of the former per mole of the Ti in the titanate, followed by heating when required. Examples of alkyl groups having 1 to 20 carbon atoms and alkenyl groups are the same as those given above.

Examples of titanates represented by the formula (XXI) wherein l is 0 are tetramethyl titanate, tetraethyl titanate, tetra-n-propyl titanate, tetraisopropyl titanate, tetra-n-butyl titanate, tetraisobutyl titanate, tetra-tert-butyl titanate, tetra-n-pentyl titanate, tetra-n-hexyl titanate, tetraisooctyl titanate, tetra-n-lauryl titanate and the like. Favorable results can be obtained by using tetraisopropyl titanate, tetra-n-butyl titanate, tetraisobutyl titanate and tetra-tert-butyl titanate. Of the titanates wherein l is 1 or greater, the dimers to hendecamers (l=1 to 10 in the formula (XXI)) of tetraisopropyl titanate, tetra-n-butyl titanate, tetraisobutyl titanate and tetra-tert-butyl titanate achieve good results.

The zirconium chelate compound can be prepared favorably, for example, by admixing the compound capable of forming a keto-enol tautomer with a zirconate represented by the formula

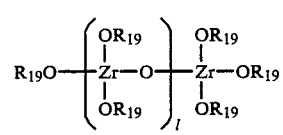

wherein l is an integer of 0 to 10, and $R_{19}$ is alkyl having 1 to 20 carbon atoms or alkenyl and the $R_{19}$ groups are the same or different, usually in the ratio of up to about 4 moles of the former per mole of the Zr in the zirconate, followed by heating when required. Examples of alkyl groups with 1 to 20 carbon atoms and alkenyl groups are the same as those exemplified above.

Examples of zirconates represented by the formula (XXII) wherein l is 0 are tetraethyl zirconate, tetra-n-propyl zirconate, tetraisopropyl zirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate and the like. Especially good result can be obtained with use of tetraisopropyl zirconate, tetra-n-propyl zirconate, tetraisobutyl zirconate, tetra-n-butyl zirconate, tetra-sec-butyl zirconate and tetra-tert-butyl zirconate. Of the zirconates wherein l is 1 or greater, the dimers to hendecamers (=1 to 10 in the formula (XXII)) of tetraisopropyl zirconate, tetra-n-propyl zirconate, tetra-n-butyl zirconate, tetraisobutyl zirconate, tetra-sec-butyl zirconate and tetra-tert-butyl zirconate give good results. The chelate compound may contain structural units wherein such zirconates are associated with each other.

Examples of especially preferred chelate compounds for use in the invention are aluminum chelate compounds such as diisopropoxy ethylacetoacetate aluminum, tris(ethylacetoacetate)aluminum, tris(n-propylacetoacetate)aluminum, tris(isopropylacetoacetate)aluminum, tris(n-butylacetoacetate)aluminum, isopropoxy bis(ethylacetoacetate)aluminum, isopropoxy bis(propionylacetonato)aluminum, tris(acetylacetonato)aluminum, tris(propylacetoacetate)aluminum, tris(propionylacetonato)aluminum, acetylacetonato-bis(ethylacetoacetate)aluminum, ethylacetoacetate bis(acetylacetonato)aluminum, tris(isopropionylacetonato)aluminum, tris(sec-butyrylacetonato)aluminum, [bis(isopropionylacetonato) sec-butyrylacetonato]aluminum and tris(butylacetoacetate)aluminum; titanium chelate compounds such as diisopropoxy-bis(ethylacetoacetate)titanate, diisopropoxy-bis(acetylacetonato)titanate and isopropoxytris(propionylacetonato)titanate; and zirconium chelate compounds such as tetrakis(acetylacetonato)zirconium, tetrakis(n-propylacetoacetate)zirconium, tetrakis(propionylacetonato)zirconium and tetrakis(ethylacetoacetate)zirconium.

According to the present invention, one of the aluminum chelate compound, zirconium chelate compound and titanium chelate compound may be used, or at least two of these compounds may be used in a suitable combination. Among these chelate compounds, it is desirable to use the aluminum chelate compound and/or the zirconium chelate compound because these compounds have the advantage of assuring high curability and giving a cured product of diminished coloration. It is suitable to use the chelate compound in an amount of about 0.01 to about 30 parts by weight per 100 parts by weight of the resin solids of the composition.

Amounts outside this range are not desirable; smaller amounts tend to result in lower crosslinking curability, whereas when used in larger amounts, the chelate compound remains in the cured product and tends to result in lower water resistance. The amount is preferably about 0.1 to about 10 parts by weight.

According to the invention, a solution-type vinyl copolymer and a compound having at least two alicyclic oxirane groups in the molecule can be incorporated into the composition in addition to the nonaqueous dispersion and the chelate compound.

The solution-type vinyl copolymer to be used can be the same stabilizer resin as used for the nonaqueous dispersion already stated. However, the copolymer can be prepared from a wider variety of monomers than those used for the dispersion stabilizer since the copolymer need not have the function of a stabilizer or contain a double bond for bonding to the polymer, that is, the copolymer need not fulfil the requirements for use as a dispersion stabilizer. The solution-type vinyl copolymer is used in an amount of about 0 to about 100 parts by weight per part by weight of the solids of the nonaqueous dispersion. The solution-type vinyl copolymer when present, imparts an improved appearance to the resulting cured product.

Examples of compounds having at least two alicyclic oxirane groups in the molecule for use in the invention are those represented by the formulae of

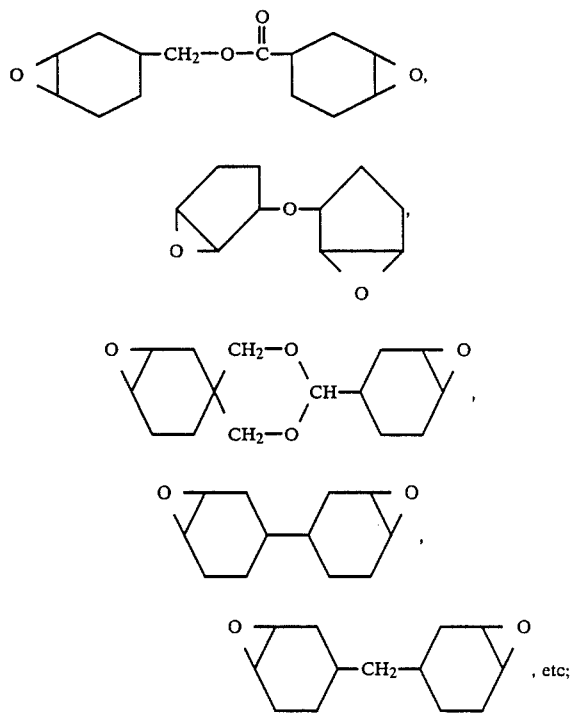

adduct of

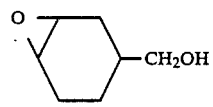

with a polyisocyanate; adduct of

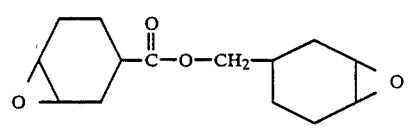

with a polybasic acid; product prepared from an ester having

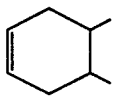

or like unsaturated group in the molecule by oxidizing the ester with peracetic acid or the like; etc. Examples of useful polyisocyanates are organic diisocyanates including aliphatic diisocyanates such as hexamethylene diisocyanate and trimethylhexamethylene diisocyanate, alicyclic diisocyanates such as xylylene diisocyanate and isophorone diisocyanate, aromatic diisocyanates such as tolylene diisocyanate and 4,4′-diphenylmethane diisocyanate. Also useful are adducts of these organic diisocyanates with as polyhydric alcohol, low-molecular-weight polyester resin, water or the like, polymers of these organic diisocyanates, isocyanate-buret compounds, etc. Commercially available as typical examples of such compounds are "BURNOCK D-750 and -800, DN-950 and -970, and 15-455" (products of Dainippon Ink & Chemicals Inc.), "DESMODUL L, NHL, IL and N3390" (products of Bayer, West Germany), "TAKENATE D-102, -202, -110N and -123N" (products of Takeda Chemical Industries, Ltd.), "COLONATE L, HL, EH and 203" (products of Nippon Polyurethane Kogyo Co., Ltd.), "DURANATE 24A-90CX" (product of Ashai Chemical Industry Co., Ltd.), etc. Examples of esters having an unsaturated group are obtained by esterifying, for example, tetrahydrophthalic anhydride, trimethylolpropane or 1,4-butanediol.

The alicyclic oxirane-containing compound, when present, imparts improved curability to the composition even if the oxirane group contained in the stabilizer of the nonaqueous dispersion is not an alicyclic oxirane group.

The solution-type vinyl copolymer resin is preferably in the range of about 1,000 to about 50,000 in number average molecular weight. When less than about 1,000 in molecular weight, the copolymer resin is difficult to prepare by the radical polymerization process which is easy to practice industrially. When the molecular weight is over about 50,000, the composition is difficult to apply efficiently and exhibits an impaired appearance when cured.

The alicyclic oxirane-containing compound is preferably up to 1,000 in number average molecular weight. When exceeding 1,000 in molecular weight, the compound becomes less compatible with the stabilizer of the nonaqueous dispersion and with the solution-type vinyl copolymer.

The alicyclic oxirane-containing compound is used in an amount of about 0 to about 200 parts by weight per 100 parts by weight of the combined amount of resin solids of the dispersion and the solution-type vinyl copolymer. The alicyclic oxirane-containing compound is not an essential component of the present composition, whereas when a compound, such as glycidyl methacrylate, which contains only aliphatic oxirane groups is present in the resin of the nonaqueous dispersion and in the solution-type vinyl copolymer, the presence of the alicyclic oxirane-containing compound permits the composition to exhibit curability at low temperatures. Generally, glycidyl methacrylate is lowest in cost among other oxirane-containing vinyl monomers, so that it is very desirable to add the alicyclic oxirane-containing compound to the composition when a glycidyl methacrylate copolymer is used for the nonaqueous dispersion and as the solution-type vinyl copolymer. Even when the nonaqueous dispersion and the solution-type vinyl copolymer contains alicyclic oxirane groups, the presence of the alicyclic oxirane-containing compound is useful for increasing the solids concentration of the composition and giving an improved appearance to the coating to be obtained. On the other hand, when the amount of the oxirane-containing compound exceeds 200 parts by weight, the composition contains an excess of low-molecular-weight component to exhibit lower curability.

When required, it is possible to incorporate into the present composition epoxy-containing resins such as Epikote 1001 (product of Shell Chemical), hydroxyl-containing resins such as styrene-allyl alcohol copolymer, low-molecular-weight silane compounds such as triphenylmethoxysilane and diphenyldimethoxysilane, common alkoxysilane-containing silicone resins, and other resins.

Further to give improved storage stability, it is possible to added to the composition compounds providing ligands for the chelate compound, such as the aforementioned compounds capable of forming a keto-enol tautomer.

Further when required, it is possible to incorporate into the present composition known surface modifying agents, flowability adjusting agents, ultraviolet absorbers, photostabilizers, curing catalysts, extender pigments, coloring pigments, metal power pigments, mica powder pigments, dyes, etc.

The present composition is used usually as diluted with an organic solvent. Examples of preferable organic solvents are hydrocarbon solvents such as toluene and xylene, ketone solvents such as methyl ethyl ketone and methyl isobutyl ketone, ester solvents such as ethyl acetate and butyl acetate, ether solvents such as dioxane and ethylene glycol diethyl ether, alcoholic solvents such as butanol and propanol, etc. These solvents can be used singly or in a suitable combination with consideration given to the stability of the nonaqueous dispersion. When alcoholic solvents are used, it is desirable to use them in combination with other solvent in view of the solubility of the resin. The resin content in the resin solution, although variable according to the contemplated use, is generally about 10 to about 70 wt.%.

The method of applying the present composition is not limited specifically but can be any of usual coating methods such as spray coating, roll coating and brush coating.

The composition of the present invention, when incorporating the copolymer Y as a dispersion stabilizer resin, is readily curable through crosslinking at low temperatures of up to about 100° C. For example, the composition can be fully cured at room temperature without any heating usually in about 8 hours to about 7 days. When heated at about 40 to about 100° C., the composition can be completely cured in about 5 minutes to about 3 hours.

The curing reaction of the present composition starts with the evaporation of the solvent and is thought to proceed in the style of a chain reaction by virtue of the vaporization of the chelating agent from the crosslinking agent. Presumably, the crosslinking agent causes the reaction to proceed through the following mechanism. For example, when the crosslinking curing agent used is an aluminum chelate compound, the vaporization of the chelating agent is followed by the reaction of the aluminum compound with the silanol group derived from the polysiloxane macromonomer to produce the bond

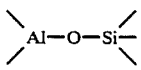

in the first stage.

Subsequently in the second stage, a coordination bond is formed between silanol and

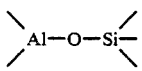

in the form of

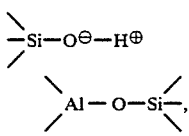

whereby the silanol is polarized. The polarized silanol reacts with an oxirane group, forming an oxonium salt as represented by

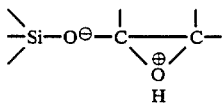

Subsequently, the ionic polymerization of oxirane groups and the addition reaction thereof with hydroxyl groups occur.

In the case of the present composition, the copolymer serving as a dispersion stabilizer resin and the solution-type vinyl copolymer added when required contain silanol groups and other functional groups derived from the polysiloxane macromonomer, one of the monomer components, and oxirane groups derived from the oxirane-containing vinyl monomer. Accordingly, besides the crosslinking reaction catalytically effected by the crosslinking curing agent as stated above, presumably various curing reactions take place concurrently, as given below.

(A) Condensation of silanol groups.
(B) Condensation of silanol groups with hydroxyl groups from oxirane groups.
(C) Addition of silanol groups to oxirane groups.
(D) Addition of hydroxyl groups to oxirane groups.
(E) Ion polymerization of oxirane groups.

With these curing reactions occurring concurrently, the resin composition can be cured in the vicinity of the surface and in the interior almost at the same time. This diminishes the difference in the degree of curing between the surface and the interior of the cured product, which therefore has sufficient hardness and is almost free of shrinkage.

When the polysiloxane macromonomer in the present composition contains alkoxyl groups which form alkoxysilane groups, the composition requires hydrolysis to form silanol groups. This hydrolysis reaction proceeds satisfactorily in the presence of a small amount of water, e.g. the moisture of air. The hydrolysis reaction will not readily proceed in the interior of the composition, and if the macromonomer has no silanol group, it is difficult to effect in the interior of the composition the curing reaction wherein the silanol group participates, whereas the interior portion can be fully cured by the reaction wherein epoxy groups participates.

The composition of the present invention, when incorporating the copolymer X serving as a dispersion stabilizer resin, is easily curable by crosslinking at low temperatures in the presence of water. More specifically, the composition of the invention can be fully cured usually in about 8 hours to about 7 days without necessitating any heating, merely by adding water to the composition and thereafter applying the composition, or by applying the composition and exposing the coating to air. Alternatively when heated, for example, at about 40 to about 100° C., the composition is curable in about 5 minutes to about 3 hours. The water needed for curing is in such a small amount as the moisture content of air. When water is added to the composition before application, about 0.1 to about 1 wt. % of water usually produces a satisfactory result.

The composition of the present invention is readily curable through crosslinking at a low temperature in the presence of a small quantity of water, presumably for the following reason. When the aluminum chelate compound is present, the alkoxyl groups derived from the monomer A hydrolyzes in the first stage in the presence of water under the catalytic action of the aluminum chelate compound to produce silanol groups. In the second stage et seq., the same reactions as already stated proceed.

The conventional curable composition of the same type as the present composition cures through the secondstage reaction only, whereas the monomer B and the alicyclic oxirane-containing compound present in the present composition permit the second-stage reaction and the third-stage reaction to proceed concurrently in a chainlike fashion, whereby the composition is crosslinked and cured. Presumably for this reason, the present composition is favorably curable at a low temperature in the presence of a small amount of water.

The composition of the invention comprises a nonaqueous dispersion which is composed of a liquid phase in the form of a solution of dispersion stabilizer resin in an organic liquid, and a solid phase of polymer particles obtained by the polymerization of a radicalpolymerizable unsaturated monomer and stably dispersed in the liquid phase; and a chelate compound incorporated in the dispersion. Consequently, the composition has a greatly increased solids content when to be applied, while the composition applied exhibits an increased viscosity to form a coating of excellent finish or appearance free of sagging or running. The coating formed from the composition has a continuous phase possessing siloxane bonds and stable to light and chemicals, contains the particulate polymer stabilized by the continuous phase and reinforcing the coating and is therefore excellent in resistance to light and chemicals. The film is afforded improved mechanical characteristics presumably by stress relaxations such as the absorption of external energy resulting from a marked plastic deformation of polymer particles and absorption of impact energy due to crazing caused by the polymer particles. Since the abovementioned first- to third-stage chain reactions in the nonaqueous dispersion system take place in the continuous phase, the composition is curable with a reduced amount of water.

The composition of the invention is usable, for example, as a coating composition, adhesive, ink, etc. The cured product of the invention is outstanding in weather resistance, water resistance, etc., so that the composition is suited for use in coating or repairing motor vehicles and containers, in coating outdoor building materials and in preparing precoated metals (PCM) and the like.

The composition of the invention has the outstanding features given below.

(1) The composition can be readily cured by crosslinking at low temperatures of up to 100° C. For example, when cured at 80° C. for 30 minutes, the composition gives a cured product having a gel fraction of at least 95%.

(2) The curing reaction requires no water or proceeds in the presence of a small quantity of water, e.g. the moisture in air.

(3) The composition starts curing with the vaporization of the solvent, so that the composition, when prepared as a single-package composition, can be stored with good stability. For example, the composition remains stable for at least 1 year when free from water.

(4) The composition is free from any curing agent, such as isocyanate, which is highly toxic.

(5) The composition is in the form of a solution having a low viscosity and therefore has a high solids concentration.

(6) The condensation reaction of silanol groups, the ion polymerization reaction of epoxy groups and other curing reactions occur concurrently, consequently diminishing the difference in the degree of curing between the surface and the interior, causing no shrinkage and rendering the composition satisfactorily usable for producing coatings of increased thickness.

(7) The composition affords cured products which are excellent in properties, especially in resistance to weather, water and impact, flexibility, resistance to staining or soiling, etc. because of reduced amounts of alcohol and other by-products.

(8) The composition has little or no likelihood of remaining uncured in the surface layer when cured, is excellent in overcoatability and recoatability and provides cured products which are outstanding in adhesion, etc.

(9) The presence of the particulate polymer in the composition results in good storage stability, permitting the composition to form coatings with an excellent finish free of running or sagging.

(10) The coating formed contains the particulate polymer, and the continuous phase thereof has siloxane bonds, so that the coating is excellent in properties, weather resistance, etc.

The present invention will be described in greater detail with reference to the following examples, in which the parts and percentages are by weight.

Preparation of nonaqueous dispersion (a-1)

The monomers given below were polymerized in a solvent mixture of xylene/n-butanol (125 parts/35 parts) using α,α′-azobisisobutyronitrile (AIBN) as an initiator.

| | |
|---|---|
| Glycidyl methacrylate | 30 parts |
| $CH_2=C(CH_3)-C(=O)-O-CH_2CH_2-CH_2-Si(OCH_3)_3$ | 10 parts |
| 2-Ethylhexyl methacrylate | 45 parts |
| Styrene | 10 parts |
| 2-Hydroxyethyl methacrylate | 5 parts |

The copolymer obtained was 12,000 in number average molecular weight, and the solution thereof was 50% in solids content and K in Gardner viscosity (25° C.). Methacrylic acid was then adducted with the copolymer to introduce into the copolymer 0.3 polymerizable double bond per molecule of the copolymer, calculated on the basis of the number average molecular weight. The resulting mixture was used as a dispersion stabilizer solution, which was 50% in solids concentration. Subsequently, 100 parts of the stabilizer solution and 200 parts of ethylcyclohexane were placed into a flask, and the monomers and polymerization initiator given below were added dropwise to the mixture at the reflux temperature over a period of 4 hours. Further with addition of 0.2 part of tert-butyl peroctoate, the reaction mixture was thereafter aged for 3 hours, giving a nonaqueous dispersion (a-1).

| | |
|---|---|
| Styrene | 10 parts |
| Methyl methacrylate | 40 parts |
| Glycidyl methacrylate | 20 parts |
| 2-Hydroxyethyl acrylate | 20 parts |
| Acrylonitrile | 10 parts |
| AIBN | 1 part |

The dispersion (a-1) was 55% in solids concentration and J in Gardner viscosity (25° C.).

Preparation of nonaqueous dispersion (a-2)

A dispersion stabilizer having the following monomer composition was prepared in the same manner as above. No polymerizable double bond was introduced into the stabilizer.

| | |
|---|---|
| $CH_2=C(H)-C(=O)-O-CH_2-$(cyclohexene oxide) | 30 parts |
| $CH_2=C(CH_3)-C(=O)-O-CH_2CH_2CH_2-Si(OCH_3)_3$ | 10 parts |
| Lauryl methacrylate | 20 parts |
| 2-Ethylhexyl methacrylate | 20 parts |
| 2-Hydroxyethyl methacrylate | 5 parts |
| Isobutyl methacrylate | 15 parts |

The dispersion stabilizer obtained was 50% in solids concentration, G in Gardner viscosity (25° C.) and 9,500 in the number average molecular weight of its resin component.

In the same manner as the dispersion (a-1), a nonaqueous dispersion (a-2) was prepared using the dispersion stabilizer and the following mixture as its particulate component.

| | |
|---|---|
| Styrene | 12 parts |
| Methyl methacrylate | 31 parts |
| 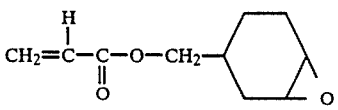 | 20 parts |
| 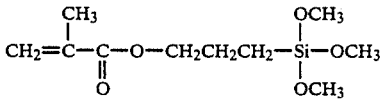 | 7 parts |
| Acrylonitrile | 15 parts |
| 2-Hydroxyethyl acrylate | 15 parts |

The dispersion was 55% in solids concentration and F in Gardner viscosity (25° C.).

Preparation of nonaqueous dispersion (a-3)

A nonaqueous dispersion (a-3) was prepared in the same manner as the dispersion (a-2) except that the monomer mixture added dropwise in the presence of the dispersion stabilizer for forming particles had the following composition.

| | |
|---|---|
| Methyl methacrylate | 70 parts |
| Acrylonitrile | 10 parts |
| Ethylene glycol dimethacrylate | 5 parts |
| Glycidyl methacrylate | 15 parts |

The nonaqueous dispersion (a-3) was 55% in solids concentration and I in Gardner viscosity (25° C.).

Preparation of nonaqueous dispersion (a-4)

The following mixture was reacted at 80° C. for 5 hours to prepare a polysiloxane macromonomer M1.

| | |
|---|---|
| Methyltrimethoxysilane | 2,720 parts (20 moles) |
| γ-Methacryloxypropyltrimethoxysilane | 256 parts (1 mole) |
| Deionized water | 1,134 parts |
| 36% Hydrochloric acid | 2 parts |
| Hydroquinone | 1 part |

The macromonomer was 2,000 in number average molecular weight and had one polymerizable double bond and 4 hydroxyl groups per molecule on the average.

| | |
|---|---|
| Styrene | 100 parts |
| 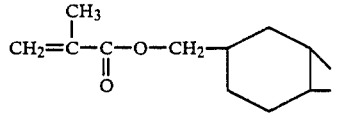 | 200 parts |
| 2-Ethylhexyl methacrylate | 400 parts |
| 2-Hydroxyethyl acrylate | 100 parts |
| 2,2′-Azobisisobutyronitrile | 20 parts |

The above mixture and 200 parts of the macromonomer M1 were added dropwise to 1000 parts of xylene at 120° C. for polymerization to obtain a transparent copolymer solution. The copolymer was 19,000 in number average molecular weight, and the solution was 50% in solids concentration and T in Gardner viscosity (20° C.). Isocyanoethyl methacrylate was adducted with the copolymer to introduce 0.3 polymerizable double bond per molecule, as calculated on the basis of the number average molecular weight. A nonaqueous dispersion (a-4) was prepared in the following manner using the vinyl copolymer as a dispersion stabilizer.

The vinyl copolymer solution (100 parts, dispersion solution), 180 parts of ethylcyclohexane and 20 parts of n-butanol were placed into a flask. The following monomers and polymerization initiator were added dropwise to the mixture at the reflux temperature over a period of 4 hours. Further with addition of 0.2 part of tert-butyl peroctoate, the reaction mixture was thereafter aged for 3 hours. The solvent was thereafter removed from the mixture in a vacuum, giving a nonaqueous dispersion (a-4).

| | |
|---|---|
| Styrene | 10 parts |
| Methyl methacrylate | 45 parts |
| 2-Hydroxyethyl acrylate | 10 parts |
| Acrylonitrile | 15 parts |
| 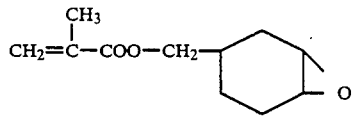 | 10 parts |
| Macromonomer M1 | 10 parts |
| 2,2′-Azobisisobutyronitrile | 1 part |

The nonaqueous dispersion (a-4) was 55% in solids concentration and QR in Gardner viscosity (25° C.).

Preparation of nonaqueous dispersion (a-5)

Phenyltrimethoxysilane (48 moles) was reacted with 2 moles of β-methacryloxyethyltriethoxysilane in the same manner as the dispersion (a-4) to obtain a polysiloxane macromonomer M2. The macromonomer M2 obtained was about 5,000 in number average molecular weight and had one vinyl group and 5 to 10 methoxy groups per molecule on the average.

The macromonomer M2 (300 parts) was mixed with the following compounds.

| | |
|---|---|
| Glycidyl methacrylate | 200 parts |
| Lauryl methacrylate | 400 parts |
| 2-Hydroxyethyl methacrylate | 100 parts |
| tert-Butyl peroctoate | 30 parts |

The mixture was added dropwise to 1,000 parts of xylene at 120° C. for polymerization to obtain a copolymer solution. The copolymer obtained was 15,000 in number average molecular weight, and the solution 50% in solids concentration and N in Gardner viscosity (25° C).

The vinyl copolymer solution (120 parts, dispersion solution), 180 parts of ethylcyclohexane and 20 parts of n-butanol were placed into a flask. The following monomers and polymerization initiator were added dropwise to the mixture at the reflux temperature over a period of 4 hours. With addition of 0.2 part of tertbutyl peroctoate, the mixture was thereafter aged for 3 hours. The solvent was thereafter removed from the mixture in a vacuum, giving a nonaqueous dispersion (a-5).

| Styrene | 15 parts |
|---|---|
| Methyl methacrylate | 40 parts |
| 2-Hydroxyethyl acrylate | 10 parts |
| Acrylonitrile | 15 parts |
| Glycidly methacrylate | 10 parts |
| Macromonomer M2 | 10 parts |
| 2,2'-Azobisisobutyronitrile | 1 part |

The nonaqueous dispersion (a-5) was 55% in solids concentration and L in Gardner viscosity (25° C.).

Preparation of nonaqueous dispersion (a-6)

A nonaqueous dispersion (a-6) was prepared in the same manner as the dispersion (a-4) with the exception of using a dispersion stabilizer having the monomer composition given below and the following monomer composition for forming particles.

Monomer composition of dispersion stabilizer

| Macromonomer M1 | 200 parts |
|---|---|
| Styrene | 100 parts |

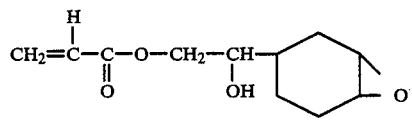 200 parts

| 2-Ethylhexyl methacrylate | 400 parts |
|---|---|
| 2-Hydroxyethyl acrylate | 100 parts |

Monomer composition for forming particles

| Styrene | 10 parts |
|---|---|
| Methyl methacrylate | 65 parts |
| Acrylonitrile | 10 parts |
| Ethylene glycol dimethacrylate | 5 parts |
| Glycidyl methacrylate | 10 parts |

The nonaqueous dispersion (a-6) obtained was 55% in solids concentration and V in Gardner viscosity (25° C.).

Preparation of solution-type vinyl copolymer (b-1)

A vinyl copolymer solution (b-1) having the following monomer composition was prepared in a solvent mixture of xylene/n-butanol (4/1) using AIBN as an initiator.

| Glycidyl methacrylate | 30 parts |
|---|---|

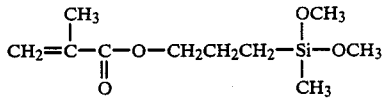 10 parts

| Styrene | 20 parts |
|---|---|
| n-Butyl methacrylate | 30 parts |
| 2-Hydroxyethyl methacrylate | 10 parts |

The solution (b-1) was 50% in solids concentration, UV in Gardner viscosity (25° C.) and 21,000 in the number average molecular weight of the resin component.

Preparation of solution-type vinyl copolymer (b-2)

A vinyl copolymer solution (b-2) having the monomer composition given below was prepared in the same manner as the copolymer (b-1).

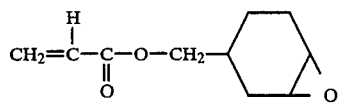 30 parts

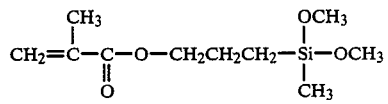 10 parts

| 2-Hydroxypropyl methacrylate | 10 parts |
|---|---|
| Styrene | 10 parts |
| n-Butyl methacrylate | 20 parts |
| 2-Ethylhexyl methacrylate | 20 parts |

The solution was 50% in solids concentration, R in Gardner viscosity and 15,600 in the number average molecular weight of the resin component.

Preparation of solution-type vinyl copolymer (b-3)

A vinyl copolymer solution (b-3) having the following monomer composition was prepared in the same manner as the solution (b-1).

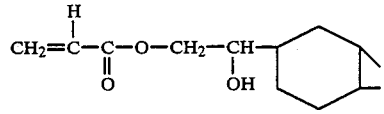 40 parts

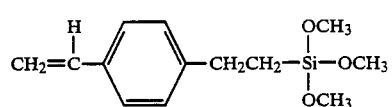 20 parts

| Styrene | 20 parts |
|---|---|
| n-Butyl methacrylate | 20 parts |

The solution (b-3) was 50% in solids concentration, W in Gardner viscosity (26° C.) and 32,000 in the number average molecular weight of the resin component.

Preparation of solution-type vinyl copolymer (b-4)

A vinyl copolymer solution (b-4) having the following monomer composition was prepared in the same manner as the solution (b-1).

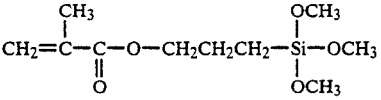

| | |
|---|---|
| Styrene | 20 parts |
| n-Butyl methacrylate | 40 parts |

The solution (b-4) was 50% in solids concentration, M in Gardner viscosity (25° C.) and 13,500 in the number average molecular weight of the resin component.

Preparation of solution-type vinyl copolymer (b-5)

A vinyl copolymer solution (b-5) having the following monomer composition was prepared in a solvent mixture of xylene/n-butanol (4/1) using AIBN as an initiator.

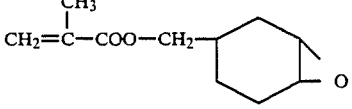

| | |
|---|---|
| Macromonomer M1 | 20 parts |
| Styrene | 20 parts |
| 2-Ethylhexyl methacrylate | 20 parts |
| 2-Hydroxyethyl methacrylate | 10 parts |

The solution (b-5) was 50% in solids concentration, T in Gardner viscosity (25° C.) and 16,000 in the number average molecular weight of the resin component.

Preparation of solution-type vinyl copolymer (b-6)

A vinyl copolymer solution (b-6) having the following monomer composition was prepared in the same manner as the solution (b-5).

| | |
|---|---|
| Glycidyl methacrylate | 25 parts |
| Macromonomer M2 | 10 parts |
| Styrene | 10 parts |
| n-Butyl methacrylate | 35 parts |
| 2-Ethylhexyl methacrylate | 20 parts |

The solution (b-6) was 50% in solids concentration, P in Gardner viscosity (25° C.) and 14,000 in the number average molecular weight of the resin component.

Preparation of solution-type vinyl copolymer (b-7)

A vinyl copolymer solution (b-7) having the following monomer composition was prepared in the same manner as the solution (b-5).

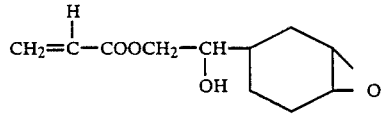

| | |
|---|---|
| Macromonomer M1 | 20 parts |
| Styrene | 20 parts |
| Methyl methacrylate | 20 parts |

The solution (b-3) was 50% in solids concentration, X in Gardner viscosity (25° C.) and 29,000 in the number average molecular weight of the resin component.

Preparation of solution-type vinyl copolymer (b-8)

A vinyl copolymer solution (b-8) having the following monomer composition was prepared in the same manner as the solution (b-5).

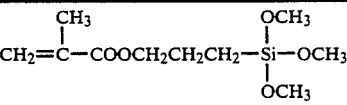

| | |
|---|---|
| Styrene | 20 parts |
| n-Butyl methacrylate | 40 parts |

The solution (b-8) was 50% in solids concentration, M in Gardner viscosity (25° C.) and 13,500 in the number average molecular weight of the resin component.

EXAMPLE 1

A composition was prepared from the following ingredients.

| | |
|---|---|
| Nonaqueous dispersion (a-1) (55% solids) | 64 parts |
| Vinyl copolymer solution (b-1) (50% solids) | 70 parts |
| Tris(ethylacetoacetate)aluminum | 1 part |

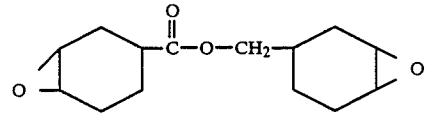

| | |
|---|---|
| | 30 parts |
| Acetylacetone | 5 parts |

The composition was adjusted to a viscosity of #4 Ford cup 35 sec (20° C.) with a thinner, i.e., isobutyl acetate/cellosolve acetate mixture (1/1 by weight) and used for coating.

A steel planel treated with zinc phosphate was electrophoretically coated with a cationic electrophoretic epoxy coating composition to a thickness of 20μ when dried and baked at 170° C. for 20 minutes.

The coating was then treated with #400 sandpaper and thereafter wiped with gauze wetted with petroleum benzine for degreasing.

Subsequently, an aminopolyester coating composition for motor vehicles was applied to the coating to a thickness of 30 μ when dried and baked at 140° C. for 30 minutes.

The resulting coating was then treated with #400 sandpaper with water, dewatered, dried and cleaned with petroleum benzine to obtain a substrate.

The composition adjusted in viscosity as above was air-sprayed to the substrate to a thickness of about 50 μ when dried, then allowed to stand at room temperature for 10 minutes and thereafter baked at 100° C. for 30 minutes. The coating was tested for evaluation with the results given in Table 1.

In Examples 2 to 7 and Comparative Examples 1 and 2 to follow, the substrate was prepared and the composition was adjusted in viscosity in the same manner as in Example 1 unless otherwise stated.

Example 2

A composition was prepared from the following ingredients. Titanium white was dispersed in the vinyl copolymer solution (b-1). The composition was applied to a substrate to a thickness of 50 μ when dried and baked at 80° C. for 30 minutes.

| Nonaqueous dispersion (a-2) (55% solids) | 73 parts |
|---|---|
| Vinyl copolymer solution (b-2) (50% solids) | 120 parts |
| Tris(ethylacetoacetate)aluminum | 2 parts |
| Titanium white JR-602 (product of Teikoku Kako Co., Ltd.) | 60 parts |

EXAMPLE 3

A base-coat composition was prepared from the following ingredients for wet-on-wet coating.

| Nonaqueous dispersion (a-3) (55% solids) | 90 parts |
|---|---|
| Vinyl copolymer solution (b-2) (50% solids) | 100 parts |
| Tris(acetylacetonato)aluminum | 1 part |
| Aluminum paste #4919 (product of Toyo Aluminum K.K.) | 5 parts |
| Aluminum paste #55-519 (product of Toyo Aluminum K.K.) | 10 parts |

The composition was adjusted to a viscosity of #4 Ford cup 15 sec (20° C.) with xylene and used for coating. A two-package clear top-coat composition comprising acrylpolyol/polyisocyanate was separately prepared.

The base-coat composition was air-sprayed to a substrate to a thickness of about 18 μ when dried and allowed to stand at room temperature for 5 minutes. Subsequently, the clear composition was air-sprayed to the base coat to a dry thickness of about 30 μ, allowed to atand at room temperature for 10 minutes and thereafter baked at 80° C. for 30 minutes.

EXAMPLE 4

A clear top-coat composition was prepared from the following ingredients for wet-on-wet coating.

| Nonaqueous dispersion (a-2) (55% solids) | 73 parts |
|---|---|
| Vinyl copolymer solution (b-2) (50% solids) | 80 parts |
| Tris(ethylacetoacetate)aluminum | 2 parts |
| Alicyclic oxirane-containing compound (*1) | 20 parts |
| Acetylacetone | 5 parts |

The clear composition was adjusted to a viscosity of #4 Ford cup 35 sec with a thinner, i.e., a mixture of Swasol 1000 (aromatic solvent, product of Cosmo Oil Co., Ltd.) and n-butanol in the ratio of 80/20 by weight and was used for coating.

A metallic base-coat composition was separately prapared which was composed of an acrylic polyol, cellulose acetate butyrate, polyisocyanate and aluminum paste. The base-coat composition was air-sprayed to a substrate to a dry thickness of about 18 μ and allowed to stand at room temperature for 5 minutes. The top-coat composition was air-sprayed to the base coat to a dry thickness of 40 μ, then allowed to stand at room temperature for 10 minutes and baked at 80° C. for 30 minutes.

The alicyclic oxirane-containing compound (*1) is a compound having a terminal alicyclic oxirane group, 650 in number average molecular weight and obtained by reacting 2 moles of

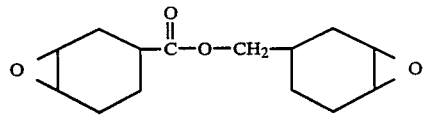

with 1 mole of adipic acid.

EXAMPLE 5

A composition was prepared from the following ingredients.

| Nonaqueous dispersion (a-1) (55% solids) | 55 parts |
|---|---|
| Vinyl copolymer solution (b-3) (50% solids) | 80 parts |
| Tetrakis(acetylacetonato)zirconium | 0.5 parts |
| Alicyclic oxirane-coating compound (*2) | 30 parts |
| Acetylacetone | 3 parts |

The composition was applied to a substrate to a dry thickness of about 50 μ and baked at 90° C. for 30 minutes.

The alicyclic oxirane-containing compound (*2) is a compound having a terminal alicyclic oxirane group, 392 in number average molecular weight and prapared by reacting 2 moles of

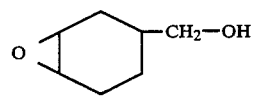

with 1 mole of hexamethylene diisocyanate.

EXAMPLE 6

A composition was prapared from the following ingredients.

| Nonaqueous dispersion (a-2) (55% solids) | 182 parts |
|---|---|
| Tris(ethylacetacetate)aluminum | 1 part |
| Acetylacetone | 3 parts |

The composition was applied to a substrate to a dry thickness of about 50 μ and baked at 80° C. for 30 minutes for curing.

EXAMPLE 7

A composition was prapared from the following ingredients.

| Nonaqueous dispersion (a-1) (55% solids) | 91 parts |
|---|---|
| Vinyl copolymer solution (b-1) (50% solids) | 100 parts |
| Tris(ethylacetoacetate)aluminum | 2 parts |
| Acetylacetone | 3 parts |

The composition was applied to a substrate to a dry thickness of about 50 μ and baked at 120° C. for 30 minutes for curing.

COMPARTIVE EXAMPLE 1

A composition was prepared from the following ingredients.

| Vinyl copolymer solution (b-4) (50% solids) | 200 parts |
|---|---|
| Tris(ethylacetoacetate)aluminum | 1 part |

The composition was applied to a substrate to a dry thickness of about 50 μ and baked at 80° C. for 30 minutes for curing.

COMPARATIVE EXAMPLE 2

A copolymer solution (b-9) was prepared in exactly the same manner as the solution-type vinyl copolymer (b-2) except that the monomer component of the formula

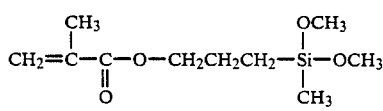

used for the solution (b-2) was wholly replaced by n-butyl methacrylate.

The solution obtained was 50% in solids concentration, N in Gardner viscosity and 14,500 in the number average molecular weight of the resin component.

A composition was prepared from the following ingredients.

| Vinyl copolymer solution (b-9) (50% solids) | 200 parts |
|---|---|
| Tris(ethylacetoacetate)aluminum | 1 part |

The composition was applied to the substrate to a dry thickness of about 50 μ and baked at 100° C. for 30 minutes.

Table 1 shows the results obtained by testing the cured coatings obtained in Examples 1 to 7 and Comparative Examples 1 and 2.

TABLE 1

| Properties | Example | | | | | | | Comp. Example | |
|---|---|---|---|---|---|---|---|---|---|
| | 1 | 2 | 3 | 4 | 5 | 6 | 7 | 1 | 2 |
| Appearance[1] | Good | Good | Good | Good | Good | Good | Good | Shrinkage | Not cured, tacky |
| Pencil hardness | F | F | HB | F | HB | F | B | — | |
| Resistance to rubbing[2] | Good | Good | Good | Good | Good | Good | Good | — | |
| Impact resistance (cm)[3] | 30 | 30 | 30 | 30 | 30 | 30 | 20 | — | |
| Water resistance[4] | Good | Good | Good | Good | Good | Good | Good | — | |
| Acid resistance[5] | Good | Good | Good | Good | Good | Good | Good | — | |
| Weather resistance[6] (gloss retentivity) | 93 | 90 | 95 | 91 | 93 | 92 | 89 | — | |

[1] The appearance of the coating was evaluated with the unaided eye on finishing.

[2] Resistance to rubbing
The coating was forcibly rubbed reciprocatingly 8 times over a stroke length of 10 cm with gauze wetted with Nisseki Silver Gasoline and was thereafter observed. The coating, when almost free of dulling, was evaluated as "good".

[3] Impact resistance
The coating was tested using a Du Pont impact tester with a needle point radius of ½ inch and weight of 500 g. The resistance is expressed in a maximum distance of fall (5-cm increments) at which the coating remained free of cracking.

[4] Water resistance
The test piece was immersed in a water bath at a constant temprature of 40° C. for 240 hours and then withdrawn from the water. The coating was evaluated as "good" when found to be free of abnormalities such as dulling and blistering.

[5] Acid resistance
The coating was spotted with 0.5 cc of 10% sulfuric acid, then allowed to stand at 20° C. at 75% RH for 48 hours, thereafter rinsed with water and checked.

[6] Weather resistance
The coating was irradiated to light for 800 hours using a Sunshine Weather-Ometer and thereafter checked for gloss retentivity.

EXAMPLE 8

A composition was prepared from the following ingredients.

| Nonaqueous dispersion (a-4) (55% solids) | 109 parts |
|---|---|
| Vinyl copolymer solution (b-5) (50% solids) | 80 parts |
| Tris(ethylacetoacetate)aluminum | 1 part |
| Acetylacetone | 5 parts |

The composition was adjusted to a viscosity of #4 Ford cup 35 sec (20 ° C.) with a thinner, i.e., a mixture of isobutyl acetate and Swasol 1000 (aromatic solvent, product of Cosmo Oil Co Ltd.) (1/1 by weight) and used for coating.

A steel planel treated with zinc phosphate was electrophoretically coated with a cationic electrophoretic epoxy coating composition to a thickness of 20 μ when dried and baked at 170° C. for 20 minutes.

The coating was then treated with #400 sandpaper, and thereafter wiped with gauze wetted with petroleum benzine for degreasing.

Subsequently, an aminopolyester coating composition for motor vehicles was applied to the coating to a thickness of 30 μ when dried and baked at 140° C. for 30 minutes.

The resulting coating was then treated with #400 sandpaper with water, dewatered, dried and cleaned with petroleum benzine to obtain a substrate.

The composition adjusted in viscosity as above was air-sprayed to the substrate to a thickness of about 50 μ when dried, then allowed to stand at room temperature for 10 minutes and thereafter baked at 80° C. for 30 minutes. The coating was tested for evaluation with the results given in Table 2.

In Examples 9 to 13 and Comparative Examples 3 and 4 to follow, the substrate was prepared and the composition was adjusted in viscosity in the same manner as in Example 8 unless otherwise stated.

EXAMPLE 9

A composition was prepared from the following ingredients. Titanium white was dispersed in the vinyl copolymer solution (b-6).

| | |
|---|---|
| Nonaqueous dispersion (a-5) (55% solids) | 73 parts |
| Vinyl copolymer solution (b-6) (50% solids) | 80 parts |
| Tris(ethylacetoacetate)aluminium | 2 parts |
| Titanium white JR-602 (product of Teikoku Kako Co., Ltd.) | 60 parts |
| 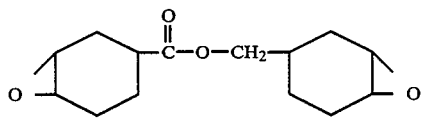 | 20 parts |
| Acetylacetone | 5 parts |

EXAMPLE 10

A base-coat composition was prepared from the following ingredients for wet-on-wet coating.

| | |
|---|---|
| Nonaqueous dispersion (a-6) (55% solids) | 90 parts |
| Vinyl copolymer solution (b-7) (50% solids) | 100 parts |
| Tris(acetylacetonato)aluminum | 1 part |
| Aluminum paste #4919 (product of Toyo Aluminum K.K.) | 5 parts |
| Aluminum paste #55-519 (product of Toyo Aluminum K.K.) | 10 parts |
| Acetylacetone | 3 parts |

The composition was adjusted to a viscosity of #4 Ford cup 15 sec (20 ° C.) with xylene and used for coating.

A clear top-coat composition was prepared from the following ingredients for wet-on-wet coating.

| | |
|---|---|
| Nonaqueous dispersion (a-4) (55% solids) | 91 parts |
| Vinyl copolymer solution (b-5) (50% solids) | 100 parts |
| Tris(acetylacetonato)aluminum | 1 part |
| Acetylacetone | 3 parts |

The clear composition was adjusted to a viscosity of #4 Ford cup 35 sec with a thinner, i.e., a mixture of Swasol 1000 (aromatic solvent, product of Cosmo Oil Co., Ltd.) and n-butanol in the ratio of 80/20 by weight and was used for coating.

The base-coat composition was air-sprayed to a substrate to a dry thickness of about 18 μ and allowed to stand at room temperature for 5 minutes. The top-coat composition was air-sprayed to the base coat to a dry thickness of about 40 μ, then allowed to stand at room temperature for 10 minutes and baked at 80° C. for 30 minutes.

EXAMPLE 11

A composition was prepared from the following ingredients.

| | |
|---|---|
| Nonaqueous dispersion (a-4) (55% solids) | 73 parts |
| Vinyl copolymer solution (b-5) (50% solids) | 80 parts |
| Tetrakis(acetylacetonato)zirconium | 2 parts |
| Alicyclic oxirane-coating compound (*1) | 20 parts |
| Acetylacetone | 5 parts |

The composition was applied to a substrate to a dry thickness of about 50 μ and baked at 90° C. for 30 minutes.

EXAMPLE 12

A composition was prepared from the following ingredients.

| | |
|---|---|
| Nonaqueous dispersion (a-5) (55% solids) | 109 parts |
| Tris(ethylacetacetate)aluminum | 2 parts |
| Alicyclic oxirane-containing compound (*2) | 40 parts |
| Acetylacetone | 5 parts |

The composition was applied to a substrate to a dry thickness of about 50 μ and baked at 100° C. for 30 minutes.

EXAMPLE 13

A composition was prapared from the following ingredients.

| | |
|---|---|
| Nonaqueous dispersion (a-5) | 91 parts |
| Vinyl copolymer solution (b-6) | 100 parts |
| Tris(ethylacetoacetate)aluminum | 2 parts |
| Acetylacetone | 2 parts |

The composition was applied to a substrate to a dry thickness of about 50 μ and baked at 120° C. for 30 minutes for curing.

COMPARATIVE EXAMPLE 3

A composition was prepared from the following ingredients.

| | |
|---|---|
| Vinyl copolymer solution (b-8) (50% solids) | 200 parts |
| Tris(ethylacetoacetate)aluminum | 1 part |

The composition was applied to a substrate to a dry thickness of about 50 μ and baked at 80° C. for 30 minutes for curing.

COMPARATIVE EXAMPLE 4

A copolymer solution (b-10) was prepared in exactly the same manner as the solution-type vinyl copolymer (b-5) except that the polysiloxane macromonomer M1 used for the solution (b-5) was wholly replaced by n-butyl methacrylate. The solution obtained was 50% in solids concentration, Q in Gardner viscosity (25 ° C.) and 15,000 in the number average molecular weight of the resin component.

A composition was prepared from the following ingredients.

| | |
|---|---|
| Vinyl copolymer solution (b-10) (50% solids) | 200 parts |
| Tris(ethylacetoacetate)aluminum | 1 part |

The composition was applied to the substrate to a dry thickness of about 50 μ and baked at 100° C. for 30 minutes.

Table 2 shows the results obtained by testing the cured coatings obtained in Examples 8 to 13 and Comparative Examples 3 and 4 in the same manner as already described.

TABLE 2

| Properties | Example 8 | 9 | 10 | 11 | 12 | 13 | Comp. Example 3 | 4 |
|---|---|---|---|---|---|---|---|---|
| Appearance | Good | Good | Good | Good | Good | Good | Shrinkage | Not cured, tacky |
| Pencil hardness | F | F | F | F | F | B | — | |
| Resistance to rubbing | Good | Good | Good | Good | Good | Good | — | |
| Impact resistance (cm) | 30 | 30 | 30 | 30 | 30 | 20 | — | |
| Water resistance | Good | Good | Good | Good | Good | Good | — | |
| Acid resistance | Good | Good | Good | Good | Good | Good | — | |
| Weather resistance (gloss retentivity) | 96 | 90 | 94 | 92 | 93 | 88 | — | |

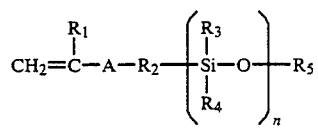

wherein A is

or

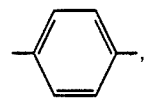

$R_1$ is a hydrogen atom or methyl, $R_2$ is a bivalent aliphatic saturated hydrocarbon group having 1 to 6 carbon atoms, $R_3$ and $R_4$ are the same or different and are each phenyl, alkyl having 1 to 6 carbon atoms or alkoxyl having 1 to 10 carbon atoms, $R_5$ is alkyl having 1 to 10 carbon atoms, and n is an integer of from 1 to 10, and wherein said vinyl copolymer Y comprises:
 i) the polysiloxane macromonomer prepared by reacting about 70 to about 99.999 mole % of a compound (A) represented by the formula

wherein $R_6$ is an aliphatic hydrocarbon group having 1 to 8 carbon atoms or phenyl, and $R_7$, $R_8$ and $R_9$ are each alkoxyl having 1 to 4 carbon atoms or hydroxyl with about 30 to about 0.001 mole % of a compound (B) represented by the formula

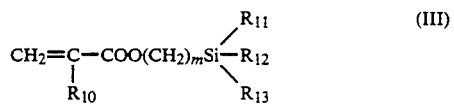

wherein $R_{10}$ is a hydrocarbon atom or methyl, $R_{11}$, $R_{12}$ and $R_{13}$ are each hydroxyl, alkoxyl having 1 to 4 carbon atoms or an aliphatic hydrocarbon group having 1 to 8 carbon atoms, at least one of $R_{11}$, $R_{12}$ and $R_{13}$

We claim:
1. A composition curable at a low temperature and characterized in that the composition comprises:
 (a) a nonaqueous dispersion of a particulate polymer insoluble in an organic liquid and prepared by polymerizing at least one radical-polymerizable unsaturated monomer in the organic liquid in the presence of a dispersion stabilizer resin, the stabilizer resin being at least one copolymer selected from the group consisting of a copolymer X and a vinyl copolymer Y, wherein said copolymer X comprises as its monomer components an oxiranecontaining vinyl monomer and an alkoxysilane-containing vinyl monomer represented by the formula being hydroxyl or alkoxyl, and m is an integer of 1 to 6, the polysiloxane macromonomer having per molecule at least two functional groups selected from hydroxyl and the alkoxyl and being about 400 to about 100,000 in number average molecular weight, and ii) an oxirane-containing vinyl monomer, (b) a chelate compound admixed with the nonaqueous dispersion. dispersion.

2. A composition as defined in claim 1 wherein the oxirane-containing vinyl monomer is a vinyl monomer containing an alicyclic oxirane group.

3. A composition as defined in claim 1 wherein the oxirane-containing vinyl monomer is an acrylic or methacrylic acid ester containing an alicyclic oxirane group.

4. A composition as defined in claim 1 wherein the coplymerx is prepared from 1 part by weight of the alkoxysilane-containing vinyl monomer and about 0.02 to about 10,000 parts by weight of the oxirane-containing vinyl monomer.

5. A composition as defined in claim 1 wherein the compound (A) is at least one compound selected from the group consisting of methyltrimethoxysilane, phenyltrimethoxysilane, butyltrimethoxysilane, methyltriethoxysilane, methyltributoxysilane, phenyltrisilanol and methyltrisilanol.

6. A resin composition as defined in claim 1 wherein the compound (B) is at least one compound selected from the group consisting of β-acryloxyethyltriethoxysilane, β-methacryloxyethyltriethoxysilane, γ-methacryloxypropyltrimethoxysilane, γ-methacryloxypropyltriethoxysilane, γ-acryloxypropyltrimethoxysilane, γ-methacryloxybutyltriethoxysilane, and γ-acryloxypropyltrisilanol.

7. A composition as defined in claim 1 wherein the polysiloxane macromonomer has about 0.2 to about 1.9 polymerizable unsaturated bonds per molecule on the average.

8. A composition as defined in claim 1 wherein the vinyl copolymer y is prepared from about 0.01 to about 98 wt. % of the polysiloxane macromonomer and about 99.9 to about 2 wt. % of the oxirane-containing vinyl monomer.

9. A composition as defined in claim 1 wherein the vinyl copolymer y is about 2,000 to about 200,000 in number average molecular weight.

10. A composition as defined in claim 1 wherein the chelate compound is at least one selected from the group consisting of aluminum chelate compound, titanium chelate compound and zirconium chelate compound.

11. A composition as defined in claim 1 which comprises about 0.01 to about 30 parts by weight of the chelate compound per 100 parts by weight of the resin solids in the composition.

* * * * *